United States Patent Office 3,681,190
Patented Aug. 1, 1972

3,681,190
PRESSURE-SENSITIVE ADHESIVE TAPE
Carl A. Dahlquist, St. Paul, Minn., assignor to Minnesota Mining and Manufacturing Company, St. Paul, Minn.
No Drawing. Filed May 7, 1970, Ser. No. 35,561
Int. Cl. C09j 7/02
U.S. Cl. 206—59 C          13 Claims

ABSTRACT OF THE DISCLOSURE

Normally tacky and pressure-sensitive adhesive tape having almost no color and excellent resistance to ultraviolet light. The adhesive comprises a blend of at least one elastomeric rubbery polymer and an amount of at least one alkylated polystyrene resin effective to render said polymer tacky.

BACKGROUND OF THE INVENTION

This invention relates to normally tacky and pressure-sensitive adhesive tapes and is especially concerned with tapes displaying almost no color and excellent resistance to ultraviolet light.

In recent years, normally tacky and pressure-sensitive adhesive tapes comprising a flexible sheet backing having firmly bonded to at least one face thereof a layer of firm normally tacky and pressure-sensitive rubber-resin adhesive have gained great commercial importance. The rubber-resin adhesives have typically comprised blends of natural or synthetic diene rubbers with such naturally occurring tackifying resins as pine wood rosins, or the resins obtained by polymerizing naturally occurring compounds such as alpha-piene, beta-piene, or limonene. Such adhesives, when compounded in proper proportions and coated upon flexible transparent sheet backings yield tapes which exhibit the desirable properties of (1) bonding to most surfaces with small contact pressure, and (2) easy clean removal when the tape is peeled away from the surface.

Tackifying resins utilized in the art to provide these adhesive tapes have been "naval stores" such as refined or chemically modified pine wood rosins, resins obtained from abietic acid, or resins obtained by polymerization of the terpenes found in turpentine. The most preferred tackifying resins have been polymerized beta-piene and modified wood rosins; however, coumarone and indene coal tar resins have also been used.

Despite the excellence of these previously mentioned tapes made with rubber-resin adhesives, they are colored, not sufficiently stable to ultraviolet light, and are in short commercial supply.

SUMMARY

This invention provides, for the first time, it is believed, a rubber-resin based pressure-sensitive tape product which has almost no color, which displays excellent stability to ultraviolet light, and which does not utilize tackifying resins of "naval stores" origin.

In accordance with the invention, normally tacky and pressure-sensitive adhesive tape products comprise a flexible sheet backing having firmly bonded to at least one face thereof a layer of firm normally tacky and pressure-sensitive rubber-resin adhesive which comprises a blend of at least one elastomeric rubbery polymer and an amount of at least one alkylated polystyrene resin effective to render said polymer tacky. It has been discovered that polymers and copolymers of alkylated styrene as well as alkylated polystyrene and polystyrene copolymers (all of which are of a water-white color) are excellent tackifying resins for such elastomeric rubbery polymers as natural rubber, synthetic polyisoprene, SBR, cis-polybutadiene, copolymers of styrene and butadiene, polystyrene-polyisoprene block copolymers, etc. The adhesive composition may also contain fillers, pigments, plasticizers, antioxidants, or other additives.

Blends of elastomeric rubbery polymers and alkylated styrene polymers which exhibit glass transition temperatures (Tg) in the range of about $-60°$ C. to about $-20°$ C. are excellent normally tacky pressure-sensitive adhesives which provide the desirable properties of lack of color and excellent stability to ultraviolet light. Those alkylated polystyrene resins having a glass transition temperature (Tg) which, when blended with one or more elastomeric rubbery polymers provides a composition having a Tg in the range of $-60°$ C. to $-20°$ C. are those having a molecular weight from about 500 to about 5000, preferably about 1000 to about 2500, optimally about 1200 to about 1800. Those resins having a molecular weight above 10,000 usually provide such a low degree of tack that they are not considered useful for tackification. It is to be understood that the aforementioned molecular weights are nominal molecular weights which are averages. The actual molecular weight varies over a wide range, average weight being the nominal molecular weight, and narrow molecular weight distributions being preferred.

The specific amount of alkylated polystyrene tackifier resin employed can vary between 20 and 120 parts per 100 parts of elastomeric rubbery polymer and will vary slightly with the particular elastomers utilized. For example, resins having a molecular weight of about 1200 to about 1800 may be combined with natural rubber in substantially the same amounts as prior art "naval stores" tackifying resins (i.e., about 36 to 120 parts by weight per 100 parts of elastomer, about 50 to 85 parts being preferred). About 20 to 120 parts of tackifier per 100 parts of polyisoprene elastomer is satisfactory, about 40 to 100 parts being preferred. With cis-polybutadiene, about 20 to 100 parts of tackifier per 100 parts of elastomer has been found effective, about 30 to 70 parts being preferred. With SBR elastomers, about 20 to 100 parts of tackifier per 100 parts of elastomer has been found effective, about 30 to 70 parts being preferred. Inclusion of antioxidants, pigments, fillers, extenders, or reinforcing agents may affect the amount of tackifier necessary to provide a desired tack.

It has been found that the alkyl groups on the styrene polymers should contain not less than 3 nor more than 12 carbon atoms, preferably not less than 4 nor more than 8, and are such as poly(tert-butylstyrene), poly(tert-amylstyrene), poly(4-methylpentyl styrene), poly(cyclohexylstyrene), etc. Non-alkylated styrene polymers such as polystyrene or poly($\alpha$-methyl styrene) are, of course, not useful as tackifying resins. However, it is possible to utilize a copolymer of a non-alkylated styrene and an alkylated styrene, a mixture of two or more alkylated styrene polymers, or a copolymer of two or more alkylated styrene monomers.

Useful alkylated styrene tackifying resins can be obtained by several common techniques. For example, alkylated styrene monomer can be polymerized by anionic polymerization to provide poly(alkylstyrene). Cationic polymerization techniques may also be used. The alkylated styrene monomer may, if desired, be copolymerized with non-alkylated monomers such as styrene, $\alpha$-methyl styrene, vinyl toluene, etc. To maintain utility as a tackifier resin, the copolymer should contain at least about 40% by weight alkylated styrene monomer, preferably about 60%. A second technique of obtaining alkylated styrene tackifier is to alkylate a styrene polymer or copolymer. When using this technique, the alkylation should result in a least 40% of the styrene units in the polymer becoming alkylated, preferably at least 70%. The ratio of the 825 cm.$^{-1}$ to 695 cm.$^{-1}$ infrared absorption bands is an indication of the ratio, $$\frac{\text{Alkylated styrene units}}{\text{Styrene units}}$$

and is a convenient measure of the degree of alkylation.

The following examples, in which all parts are by weight unless otherwise noted, illustrate preparation of the normally tacky and pressure-sensitive adhesive compositions of this invention, without limiting the scope thereof.

DESCRIPTION OF THE PREFERRED EMBODIMENTS

Example 1

This example describes the preparation and testing of a normally tacky and pressure-sensitive adhesive tape utilizing a poly(alkylstyrene) tackifying resin e.g., poly(tert-butylstyrene). Ten parts of polystyrene-polyisoprene AB block copolymer having an A block molecular weight of about 45,000 and a B block molecular weight of 105,000 and 3 parts of polystyrene-polyisoprene-polystyrene ABA block copolymer having A block molecular weights of about 8,000 and a B block molecular weight of about 100,000 (commercially available from the Shell Chemical Company under the trade designation "Kraton" 107) were dissolved in 62 parts of toluene, to which was added 20 parts of a 30% solids solution of poly(tert-butylstyrene) in toluene. The poly(tert-butylstyrene) resin had an intrinsic viscosity of 0.024 deciliter per gram and a molecular weight of about 1500 (as determined by gel permeation chromatography). The adhesive solution was coated on 1.8 mil cellophane film and dried at 160° F. to provide a dry adhesive coating weight of about 0.0023 gram per cm.$^2$. The adhesive coating was colorless and water-clear in appearance. The coated film was cut into one-half inch wide strips, each of which was tested for peel adhesion on a steel plate in accordance with ASTM D-1000. Each adhesive tape was then peeled off the steel plate at a peeling angle of 180° and a rate of 6 inches per minute. Observed peel force was 46 oz. per one-half inch width. Additionally, the tape was also found to adhere well to paper after only light contact. When this same test was repeated utilizing a 1.5 mil polyethylene terephthalate film backing, a peel adhesion of 37 oz. per one-half inch width was obtained.

Examples 2–4

These examples illustrate use of various quantities of poly(tert-butylstyrene) tackifying resin with elastomer. The procedures and materials utilized in Example 1 were followed in making the compositions set forth in Table I. Each pressure-sensitive adhesive was coated on a cellophane film backing and tested in accordance with ASTM D-1000 as was done in Example 1. These tapes were found to be clear, colorless, and excellent pressure-sensitive adhesives, displaying the peel adhesion values shown in Table I. The tests were repeated using a 1.5 mil poly-ethylene terephthalate film backing, the peel adhesions obtained being listed in Table I as Examples 2a through 4a.

TABLE I

| Example | AB polymer | ABA polymer | Tackifying resin | ASTM D-1000 peel adhesion, oz./½" width |
|---------|-----------|-------------|------------------|----------------------------------------|
| 2       | 10        | 3           | 2                | 23                                     |
| 3       | 10        | 3           | 4                | 35                                     |
| 4       | 10        | 3           | 8                | 42                                     |
| 2a      | 10        | 3           | 2                | 17                                     |
| 3a      | 10        | 3           | 4                | 35                                     |
| 4a      | 10        | 3           | 8                | 43                                     |

Examples 5–9

These examples illustrate use of poly(tert-butylstyrene) tackifying resin of various nominal molecular weights. Natural rubber was milled for about 9 minutes at 70° C. on a laboratory rubber mill and pressure-sensitive adhesive solutions prepared from this milled rubber, toluene, and tackifier as shown in Table II. Each adhesive solution was coated on a 1.5 mil polyester film, dried, and tested in the manner utilized in Example 1. Each adhesive, except 9 (which is a control utilizing a polyterpene tackifying resin) was clear, transparent, and an excellent pressure-sensitive adhesive displaying the peel adhesion values shown in Table II.

The tackiness of each adhesive was determined by means of a probe tack test (modified ASTM D1878–61T) utilizing a ¹⁄₁₆ inch diameter stainless steel probe having a flat polished end which is brought into end-on contact with each adhesive, held in contact under a load of 2 gms. (100 grams/cm.$^2$) for one second, and withdrawn at the rate of 0.5 cm./sec., test results being shown in Table II. Examples 6, 7 and 8 exhibited greater tackiness than did Example 9 (the control).

Each of the adhesives was also evaluated by adhering a tape made with the adhesive to kraft paper, the adhesion ranking from poorest (a) to best (e) being shown in Table II. Shear adhesion tests were conducted on Examples 7 and 9, the poly(tert-butylstyrene) tackifying resin displaying a failure time of 940 minutes as compared to 706 minutes for the prior art polyterpene tackifier.

TABLE II

| Example | Natural rubber | Toluene | Tackifying resin | Peel adhesion, oz./½ in. width | Probe tack, gms. | Adhesion to kraft paper[1] |
|---------|---------------|---------|------------------|-------------------------------|------------------|---------------------------|
| 5       | 10            | 78.8    | 7.5 parts of 800 mol wt. poly (tert-butyl styrene) | 1.3  | 20 | a |
| 6       | 10            | 83.3    | 7.5 parts of 1,200 mol wt. poly(tert-butyl styrene) | 8.3 | 05 | b |
| 7       | 10            | 80.3    | 7.5 parts of 1,600 mol wt. poly(tert-butyl styrene) | 17  | 65 | e |
| 8       | 10            | 80.2    | 7.5 parts of 2,000 mol wt. poly(tert-butyl styrene) | 23  | 80 | c |
| 9       | 10            | 90.8    | 7.5 parts poly(β-pinene resin)[2]                    | 16.5| 35 | d |

[1] a=poorest; e=best.
[2] Commercially available from the Pennsylvania Industrial Chemicals Corporation under the trade designation "Piccolyte" S-115.

Examples 10–11

These examples illustrate use of poly(alkylated styrene) tackifying resins other than poly(tert-butylstyrene). A tackifying resin was obtained by alkylating 1000 molecular weight polystyrene with tertiary amyl chloride. Toluene, milled natural rubber base similar to that used in Examples 5–9, and the tackifying resin were combined to prepare two adhesive compositions, Example 10 containing 43 parts by weight of rubber and Example 11 containing 100 parts by weight of resin to 100 parts by weight of rubber. Each solution was coated on 1.5 mil polyester film to give a coating weight, after drying at 85° F., of about 0.0023 gram per cm.$^2$. The coatings were clear, transparent, and tacky. The tack value of each coating exceeded 50 grams as determined by the methods used in Examples 5–9. Peel adhesion (ASTM D1000–68) values were 14 oz./½" for Example 10 and 29.5 oz./½" for Example 11. Each tape peeled cleanly from the stainless steel plate without leaving visible residue. When tested for peel adhesion the tapes were more than 5 months old, indicating the permanence of these tackifying resins.

Example 12

A pressure-sensitive adhesive was prepared by addition of 67 parts of poly(4-methyl pentyl styrene) having a molecular weight of about 1800 and a softening point of 25-50° C. to 100 parts of natural rubber milled as described in Examples 5-9, all in toluene solution. The resulting adhesive solution was coated on 1.5 mil polyester film to provide a coating weight, after drying at 85° F., of about 0.0023 g./cm.$^2$. The coating was clear, colorless, and tacky. The adhesion of tapes prepared by cutting ½ inch wide strips from the aforementioned coatings was measured (ASTM D1000-68) and found to be 5.8 oz./½" width. The tape exhibited smooth, clean peel. This peel adhesion value is somewhat lower than that exhibited by a highly aggressively tacky pressure-sensitive tape but is useful for many purposes such as drafting or protective tape. Poly(4-methyl phentyl styrene) was found to be a soft resin useful in combination with higher melting poly(alkyl styrene) resins.

Example 13

Poly(4-methyl pentyl styrene) having a molecular weight of about 1800 was combined with cis-polybutadiene (commercially available from the B. F. Goodrich Company under the trade designation 'Ameripol" 220) in toluene such that there was 43 parts by weight of resin to 100 parts by weight of elastomer. The adhesive solution was coated on 1.5 mil polyester film, and dried at 85° F., to provide a coating weight of about 0.0023 g./cm.$^2$, the tape being clear, colorless, and tacky.

Tackiness of the coating was determined by cutting strips of ½ inch wide tape and measuring its peel adhesion (ASTM D1000-68). Peel adhesion was found to be 5.3 oz./½ inch width.

Examples 14-19

These examples illustrate use of various alkylated polystyrene polymers as tackifying resins. Anionically polymerized polystyrene of 1000 molecular weight was treated with the alkylating agents shown in Table III to provide tackifying resins having the melt temperatures shown in Table III. The temperature at which each resin begins to stick to a stainless steel gradient temperature melting bar was also determined and is shown in Table III.

An adhesive solution in toluene was prepared from each resin and natural rubber milled as described in Examples 5-9, the rubber:resin ratio being 100:67. Each solution was coated on 1.8 mil cellophane film and dried at 85° F. to provide clear transparent adhesive tapes. The peel adhesion of each tape was determined in accordance with ASTM D-1000, the results being illustrated in Table III.

TABLE III

| Ex. | Alkylation agent | Resin stick temp., °C. | Resin melt temp., °C. | Peel adhesion oz./½ in. |
| --- | --- | --- | --- | --- |
| 14 | Cyclohexyl chloride | 119 | 134 | 12.5 |
| 15 | Diisobutylene | 88 | 96 | 14 |
| 16 | 2,4,4-trimethyl pentene-2 | 60 | 76 | 12.6 |
| 17 | 2-methyl butene-1 | 50 | 60 | 11.7 |
| 18 | Propylene | 99 | 110 | 14 |
| 19 | Cyclohexene and t-butyl chloride | 112 | 123 | 11 |

Example 20

The tackifying resin obtained in Example 14 by alkylation of 1000 molecular weight polystyrene with cyclohexyl chloride was combined with GR-S elastomer (commercially available from the Shell Chemical Company under the trade designation SBR 1011) in a rubber:resin ratio, of 1:1 in toluene. Clear colorless pressure-sensitive tape was prepared and tested in the manner described in the previous examples, the peel adhesion being 11.5 oz./½ inch width.

Tape samples made with adhesive containing poly(alkyl styrene) tackifying resins and exposed to an ultraviolet light source exhibited greater resistance to the ultraviolet light than did tape made with prior art tackifying resin (β-pinene) as evidenced by a lesser degree of color formation.

I claim:
1. As a new article of commerce, a roll of normally tacky and pressure-sensitive adhesive tape having improved ultra-violet light resistance wound directly upon itself in overlapping convolutions and capable of being unwound therefrom without delaminating or offsetting, said tape comprising in combination a thin flexible sheet backing having firmly bonded to at least one face thereof a layer of normally tacky and pressure-sensitive rubber-resin adhesive comprising a clear, transparent blend of at least one elastomeric polymer and an amount of at least one alkylated polystyrene tackifying resin effective to render said composition tacky, said resin having a molecular weight of 500 to 5,000, at least 40% by weight of the monomer units in said resin consisting of a styrene having a 4-8 carbon alkyl substituent on the aromatic ring.

2. The tape of claim 1 wherein the tackifying resin is poly(tertiary-amyl styrene).

3. The tape of claim 1 wherein the tackifying resin is poly(4-methyl pentyl styrene).

4. The tape of claim 1 wherein the tackifying resin is poly(tertiary-butyl styrene) and the elastomer is natural rubber.

5. The tape of claim 1 wherein the tackifying resin is poly(tertiary-butylstyrene).

6. The tape of claim 5 wherein the elastomer is natural rubber.

7. The tape of claim 1 wherein the elastomer is cis-polybutadiene.

8. A substrate having as a coating thereon a film of normally tacky and pressure-sensitive rubber-resin adhesive which comprises a clear, transparent blend of at least one elastomeric polymer and an amount of at least one alkylated polystyrene tackifying resin effective to render said composition tacky, said resin having a molecular weight of 500 to 5,000, at least 40% by weight of the monomer units in said resin consisting of a styrene having a 4-8 carbon alkyl substituent on the aromatic ring.

9. The article of claim 8 wherein said resin is poly(tertiary-butyl styrene).

10. The article of claim 8 wherein said resin is poly(tertiary-amyl styrene).

11. The article of claim 8 wherein said resin is poly(4-methyl pentyl styrene).

12. The article of claim 8 wherein said elastomer is natural rubber.

13. The article of claim 8 wherein said elastomer is cis-polybutadiene.

References Cited

UNITED STATES PATENTS

| | | | |
| --- | --- | --- | --- |
| 3,055,496 | 9/1962 | Dunlap | 117—68.5 X |
| 3,285,771 | 11/1966 | Dabroski | 117—122 PX |
| 2,786,032 | 3/1957 | Hollyday et al. | 260—93.5 AX |
| 2,072,120 | 3/1937 | Mikeska et al. | 260—93.5 AX |
| 2,723,261 | 11/1955 | Levine et al. | 260—93.5 SX |
| 3,137,682 | 6/1964 | Corson et al. | 260—93.5 WX |
| 3,546,194 | 12/1970 | Dasch et al. | 260—93.5 AX |

(Other references on following page)

UNITED STATES PATENTS

| | | | |
|---|---|---|---|
| 3,413,246 | 11/1968 | Weymann et al. | 260—892 X |
| 3,474,159 | 10/1969 | Juvelano et al. | 260—93.5 AX |
| 3,535,153 | 10/1970 | Korpman | 117—122 P |

FOREIGN PATENTS

| | | |
|---|---|---|
| 1,812,218 | 3/1970 | Germany. |

OTHER REFERENCES

Boundy et al., "Styrene: Its Polymers, Copolymers and Derivatives," 1952, pp. 873–875.

ROBERT F. BURNETT, Primary Examiner

J. C. GIL, Assistant Examiner

U.S. Cl. X.R.

117—68.5, 122 P, 122 PA, 122 PF, 162; 156—338; 161—167, 244, 239; 260—4 AR, 33.6 A, 93.5 A, 892, DIG. 18

UNITED STATES PATENT OFFICE
CERTIFICATE OF CORRECTION

Patent No. 3,681,190    Dated Aug. 1, 1972

Inventor(s) Carl A. Dahlquist

It is certified that error appears in the above-identified patent and that said Letters Patent are hereby corrected as shown below:

Column 1, line 34 (both occurrences) "piene" should be -- pinene --.

line 48 "piene" should be -- pinene --.

Column 4, Table II under the heading, Probe tack, gms. "05" should be -- 50 --.

Signed and sealed this 20th day of February 1973.

(SEAL)
Attest:

EDWARD M. FLETCHER, JR.
Attesting Officer

ROBERT GOTTSCHALK
Commissioner of Patents